Jan. 3, 1928.
W. D. HICKS
1,654,934
MACHINE FOR MAKING LATHS
Filed May 27, 1925
7 Sheets-Sheet 1
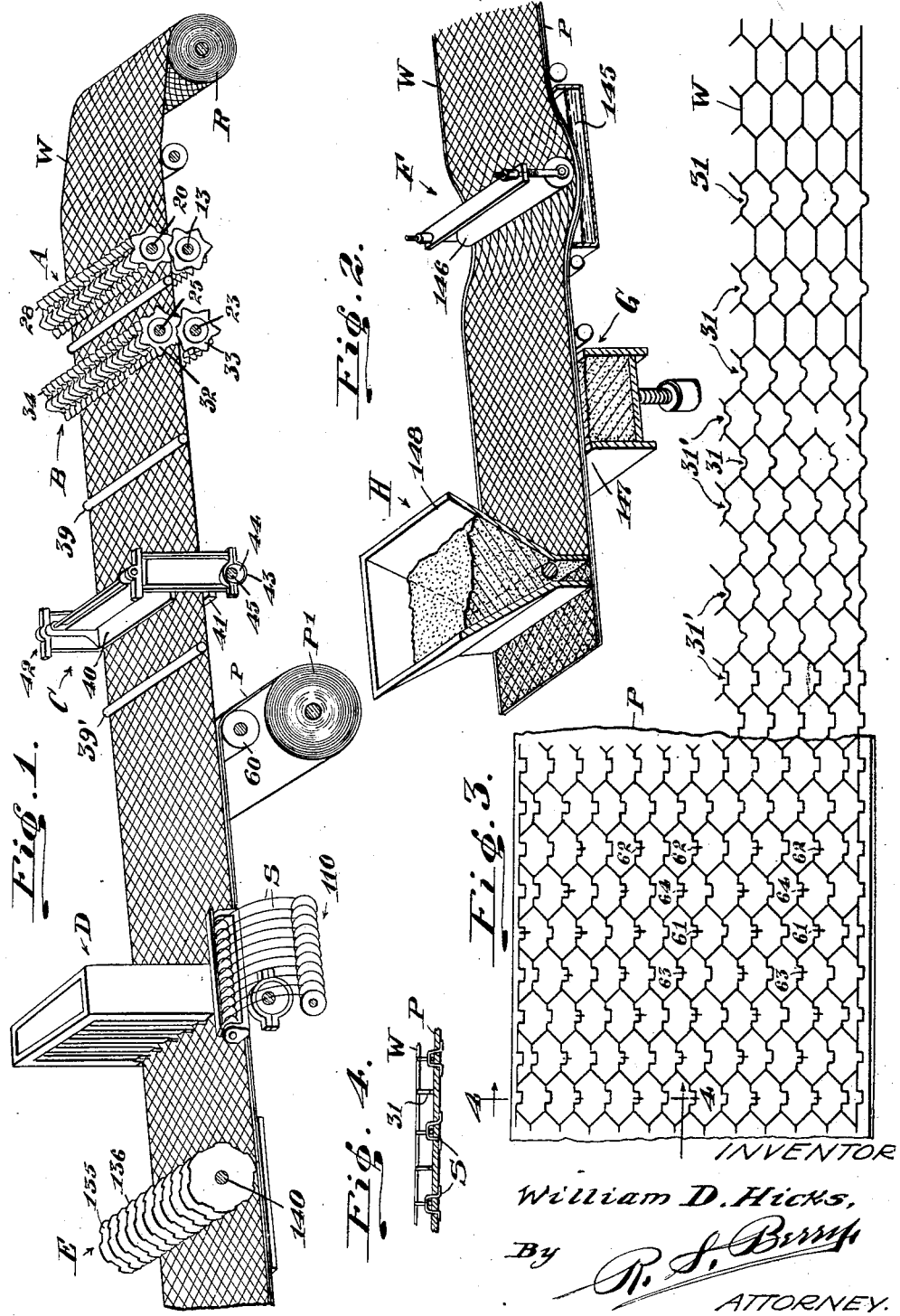
INVENTOR
William D. Hicks,
By R. S. Berry
ATTORNEY.

Jan. 3, 1928.
W. D. HICKS
1,654,934
MACHINE FOR MAKING LATHS
Filed May 27, 1925
7 Sheets-Sheet 2
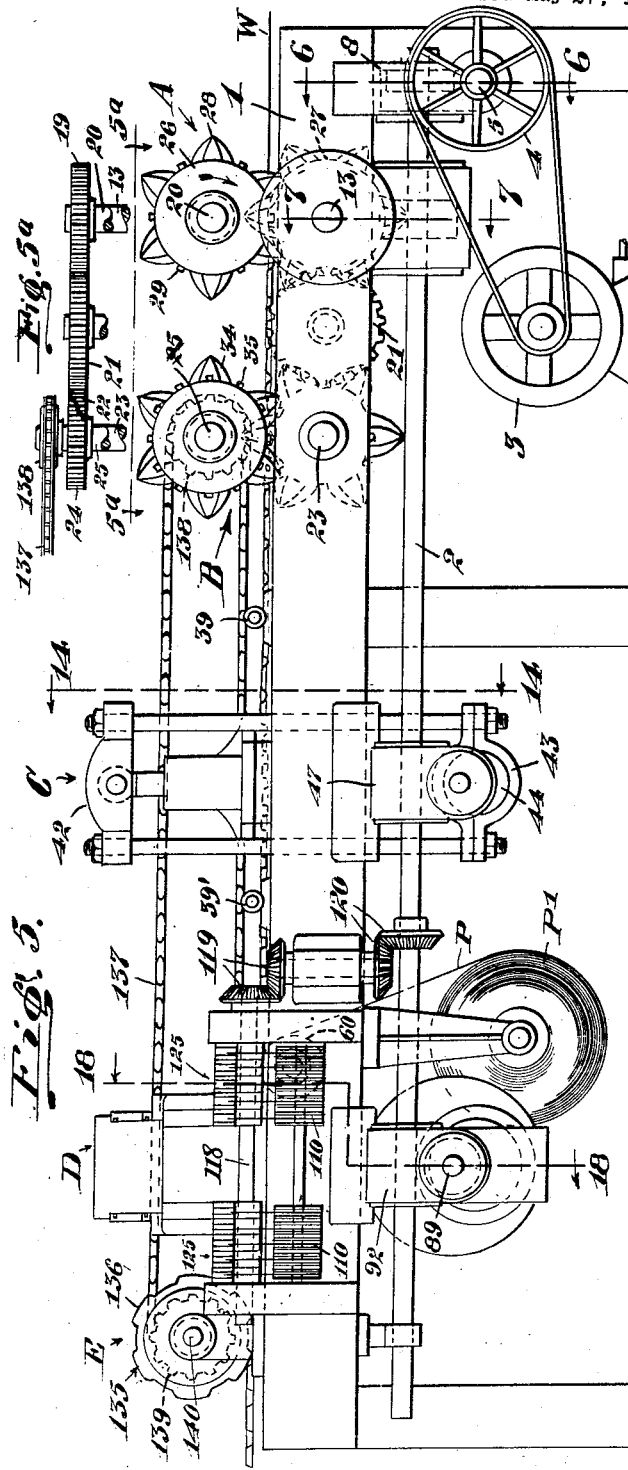
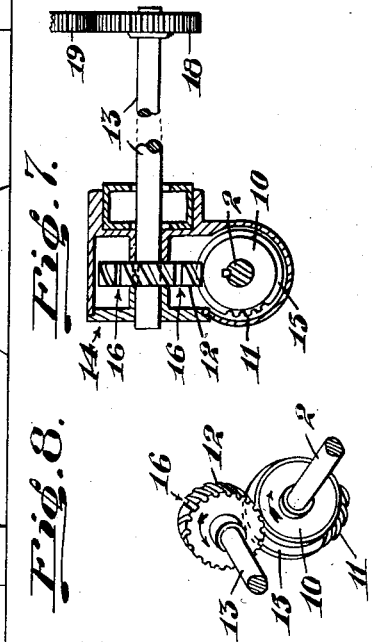
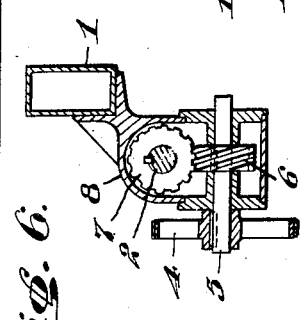
INVENTOR:
William D. Hicks,
By
ATTORNEY.

Jan. 3, 1928.
W. D. HICKS
1,654,934
MACHINE FOR MAKING LATHS
Filed May 27, 1925 7 Sheets-Sheet 3
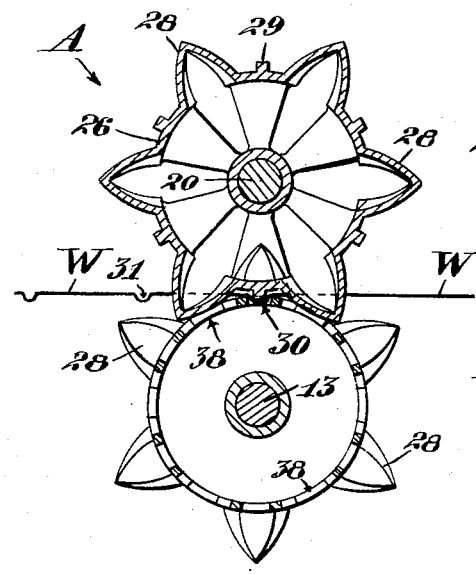
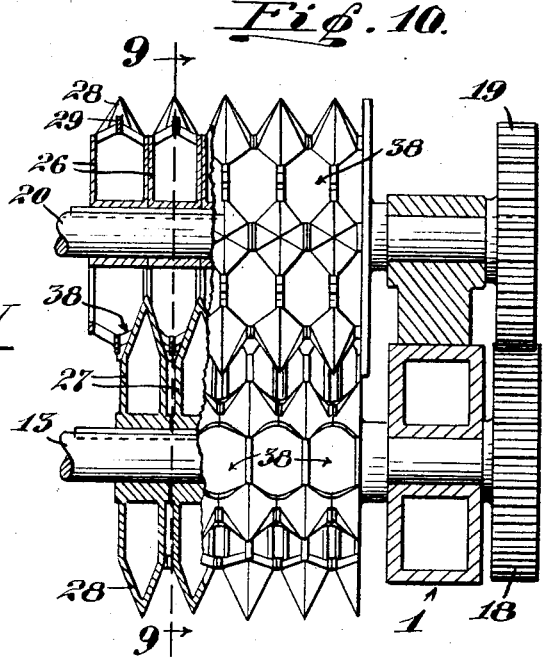
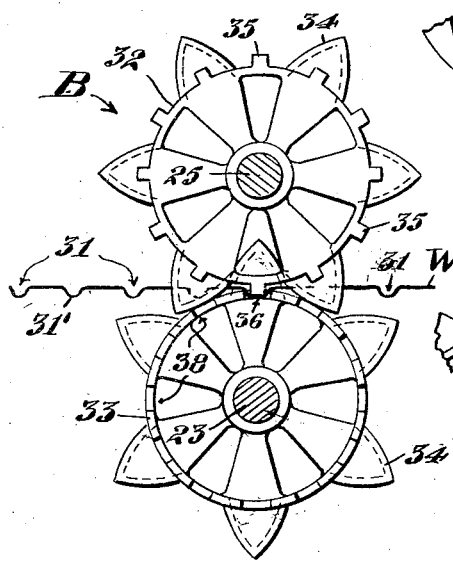
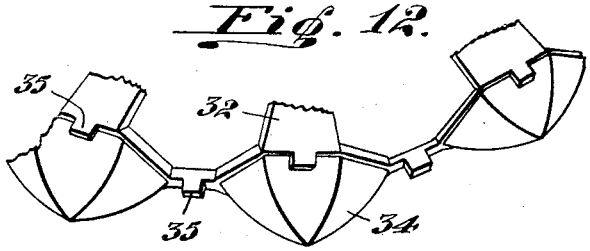
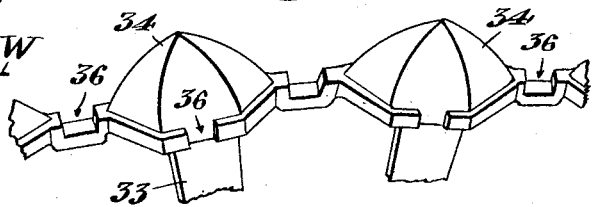
INVENTOR:
William D. Hicks,
By R. S. Berry
ATTORNEY.

Jan. 3, 1928.

W. D. HICKS

MACHINE FOR MAKING LATHS

Filed May 27, 1925 — 7 Sheets-Sheet 4

INVENTOR:
William D. Hicks,
By R. S. Berry
ATTORNEY.

Jan. 3, 1928.
W. D. HICKS
1,654,934
MACHINE FOR MAKING LATHS
Filed May 27, 1925
7 Sheets-Sheet 5
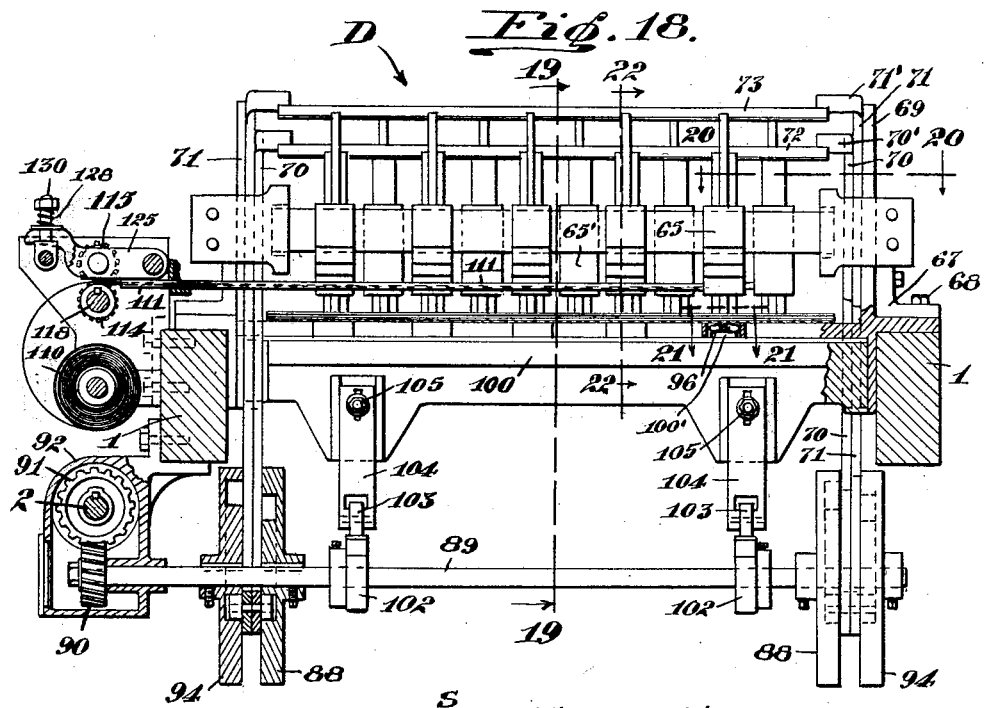
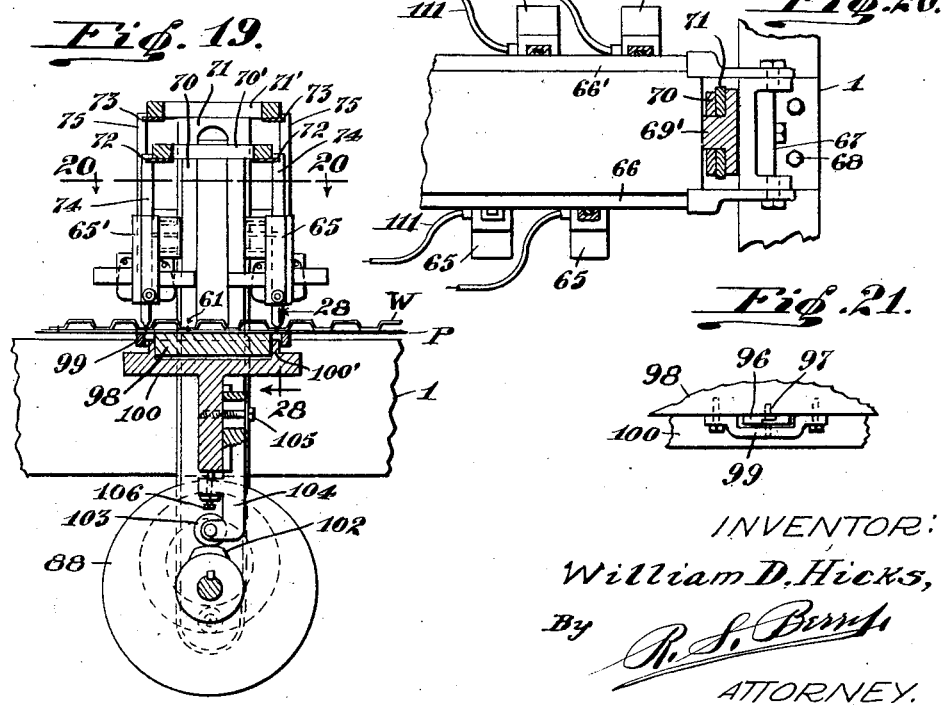
INVENTOR:
William D. Hicks,
By R. S. Berry
ATTORNEY.

Jan. 3, 1928.
W. D. HICKS
1,654,934
MACHINE FOR MAKING LATHS
Filed May 27, 1925  7 Sheets-Sheet 6
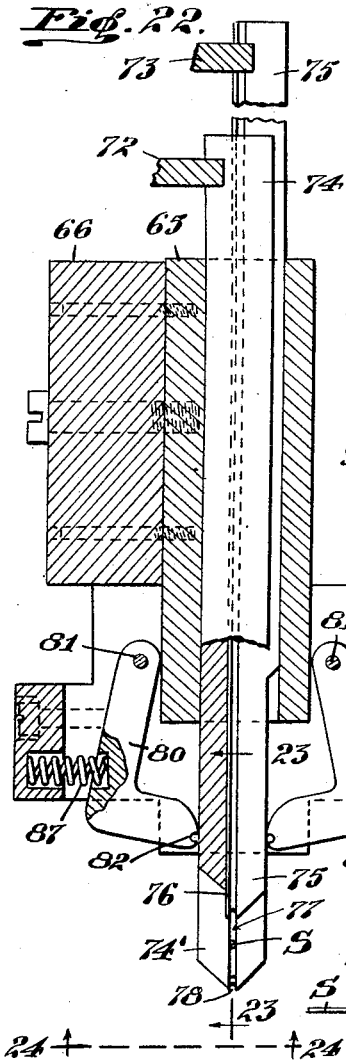
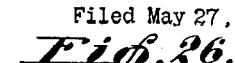
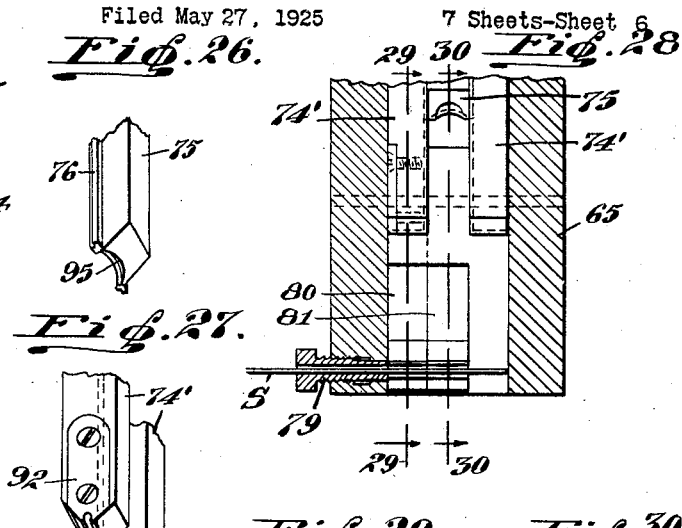
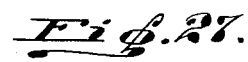
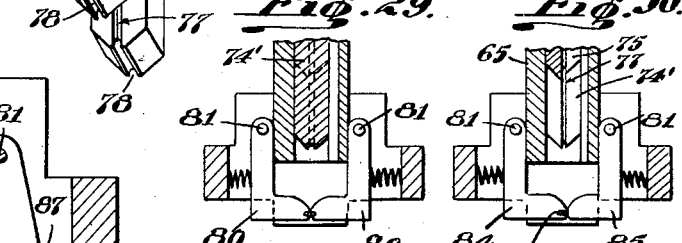
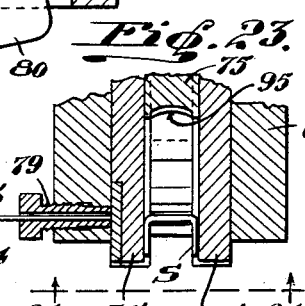
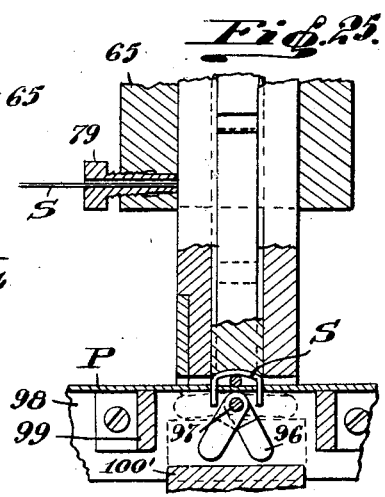
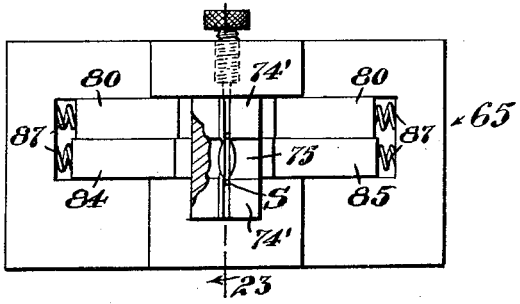
INVENTOR:
William D. Hicks,
By R. S. Berry
ATTORNEY.

Jan. 3, 1928. 1,654,934
W. D. HICKS
MACHINE FOR MAKING LATHS
Filed May 27, 1925 7 Sheets-Sheet 7
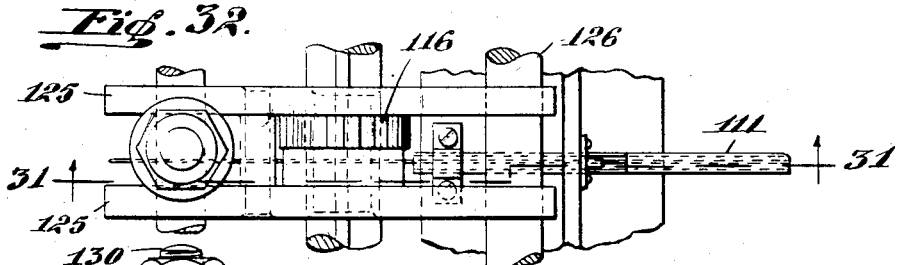
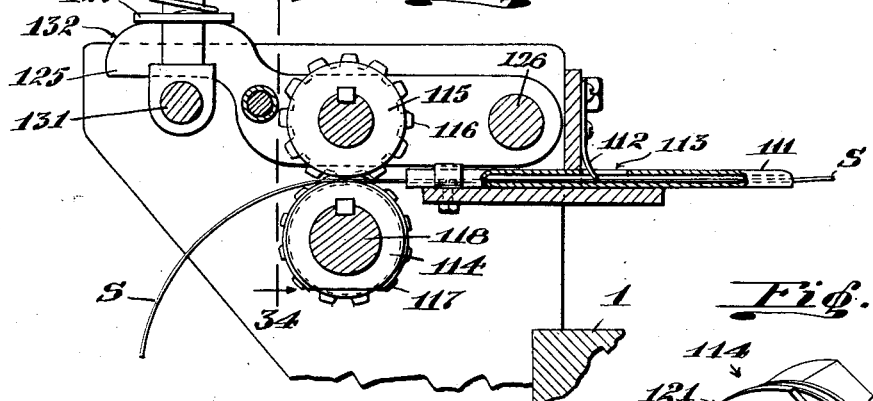
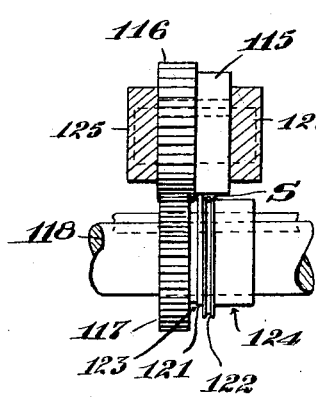
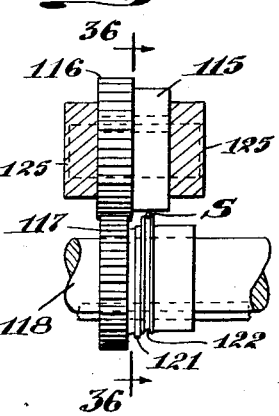
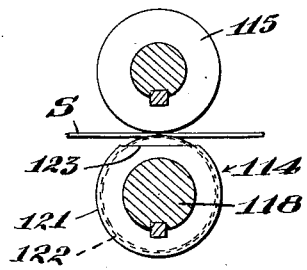
INVENTOR:
William D. Hicks,
By
ATTORNEY Patented Jan. 3, 1928.

1,654,934

UNITED STATES PATENT OFFICE.

WILLIAM D. HICKS, OF INGLEWOOD, CALIFORNIA.

MACHINE FOR MAKING LATHS.

Application filed May 27, 1925. Serial No. 33,222.

This invention relates to machines for forming plaster lath and more particularly to the manufacture of lath of the character set forth in my co-pending application for Letters Patent filed July 14, 1923, Serial Number 651,673 and which includes a woven wire mounted upon and spaced from a backing sheet of building paper or pulp board by means of fastenings connecting the backing sheet to loops or offsets formed in the wire mesh.

The object of the invention is to provide a machine for producing economically a lath including a wire reinforcement which will be so spaced with respect to a base or wall upon which the lath is to be mounted that the reinforcement will be disposed well within the plaster or other cementitious material to be applied to the lath; another object being to form the spacing means as a part of the reinforcement wire itself.

It is also an object to provide a machine for the manufacture of a lath embodying a woven wire reinforcement to which a paper backing sheet is attached.

A further object is to provide a machine which will automatically produce lath of the character stated, including formation of spacing means in the wire reinforcement, stapling the wire to a paper backing sheet, and coating the structure with water proofing and absorptive and fire resisting materials.

Briefly, the machine comprises means adapted to receive poultry wire netting, means to feed said wire through the machine step by step, certain of said feeding means also being adapted to form crimps or offsets in portions of the wire for the purpose of spacing the body of the wire structure from a backing sheet applied thereto, means to align the crimped or offset portions, means to staple certain of said offset portions on a backing sheet after the wire passes from the aligning means, means to supply stapling wire to the stapling means, means to supply the backing sheet, means to coat the entire structure with water proofing material which serves also as a cement to assist in uniting the wire structure to the sheet, and means to supply absorptive and fire proofing substances for adherence to the water proofing material.

In addition to the various combinations of the parts above mentioned, novelty also resides in various details of construction. For instance, the wire feeding and crimping means include interfitting parts certain of which are adapted to enter the meshes of the wire during operation to feed the wire and certain of which are adapted to engage the twisted parts of the meshes and form therein the crimps or offsets which subsequently are employed to space the body of the wire lath from the backing sheet. Inasmuch as complete shaping and truing of the offsets in one operation would tend to rupture the wire, the formation of such offsets is produced in a plurality of operations, the initial crimping being formed by the feeding means above described, the final shaping and truing being performed between a pair of vertically reciprocable plates. The stapling means comprises a plurality of devices each of which is provided with a pair of spaced forming jaws grooved to receive the stapling wire and adapted to form the staple, a tongue being slidable between said jaws for projecting the staple and forcing the same through the backing sheet to bind the respective offset portion of the wire lath to said sheet. The stapling means also includes devices for properly guiding and retaining the staple-forming wire in position for operation thereupon by said jaws and tongue and for clinching the staple. Each stapling member cooperates with means for feeding the stapling wire at the required intervals, means being provided to prevent withdrawal of wire which has already been fed. Means are also provided beyond the stapling means for positively advancing the assembled wire and backing.

The invention resides in the new and useful combination and arangement of parts and features of construction illustrated in certain forms in the accompanying drawings, described in a general way and pointed out in the appended claims, it being understood that the invention is limited only as defined by the claims and the prior art.

In the accompanying drawings, wherein certain embodiments of the invention are disclosed by way of illustration:

Fig. 1 is a perspective view indicating in extended diagrammatic form the various mechanisms which operate to shape the wire and attach the same to the paper backing sheet;

Fig. 2 is a similar view indicating the means for treating the structure with waterproofing and absorptive fire resisting materials;

Fig. 3 represent diagrammatically the various step-by-step forming operations to which the wire strip is subjected;

Fig. 4 is a cross sectional detail indicated by line 4—4 of Figure 3 showing the construction of the assembled lath and backing sheet;

Fig. 5 is a side elevation of the parts of the machine represented diagrammatically in Fig. 1;

Figure 14:
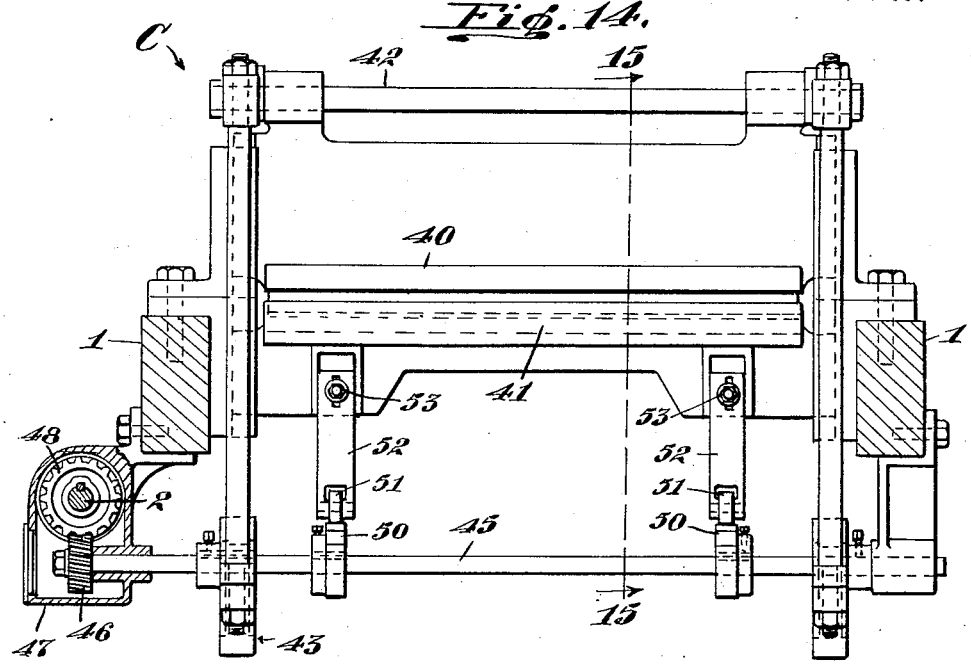
Figure 16:
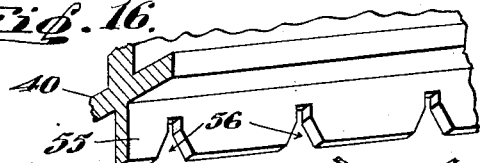
Figure 15:
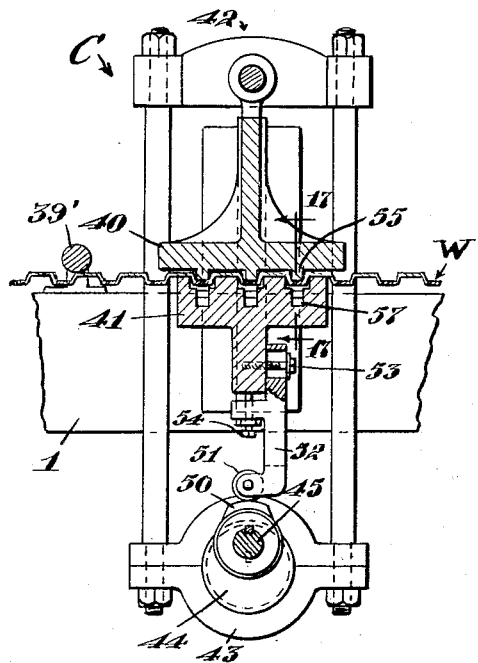
Figure 17:
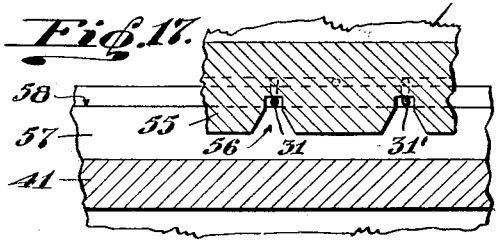

Fig. 5ª is a detail as seen on the line 5ª—5ª of Fig. 5 indicating the gear arrangement for the two sets of star wheels employed in the machine;

Fig. 6 is a vertical sectional detail taken on the line 6—6 of Fig. 5 showing means for imparting power to the main drive shaft of the machine;

Fig. 7 is a vertical sectional detail taken on the line 7—7 of Fig. 5, showing the means for imparting intermittent rotation from the main drive shaft to the means which feeds the wire netting and performs the initial crimping operations;

Fig. 8 is a perspective representation of the gears employed in the transmission shown in Fig. 7;

Fig. 9 is a cross section through the interfitting devices which perform the first feeding and shaping or crimping operation, this being taken on the line 9—9 of Fig. 10;

Fig. 10 is partially a vertical section and partially an elevation of the devices shown in Fig. 9;

Fig. 11 is a view taken transversely to the axes of the rotating device which perform the second feeding and crimping operation;

Fig. 12 is an enlarged detail in perspective of the operative portion of the upper member of the structure shown in Fig. 11;

Fig. 13 is a similar view of the operative portion of the lower member of the structure shown in Fig. 11;

Fig. 14 is chiefly an elevation of the aligning and crimp-truing means taken approximately from the line 14—14 of Fig. 5;

Fig. 15 is a vertical section taken on the line 15—15 of Fig. 14;

Fig. 16 is a fragmentary perspective view indicating the operation of the parts of Fig. 15;

Fig. 17 is a sectional detail taken on the line 17—17 of Fig. 15;

Fig. 18 is partially an elevation and partially a vertical section taken approximately on the line 18—18 of Fig. 5;

Fig. 19 is a vertical cross section taken on the line 19—19 of Fig. 18;

Fig. 20 is a horizontal detail taken on the lines 20—20 of Figs. 18 and 19;

Fig. 21 is a similar detail taken from the line 21—21 of Fig. 18;

Fig. 22 is a vertical sectional detail through one of the stapling devices, approximately as indicated by the line 22—22 of Fig. 18, showing the formed staple in position and about to be expelled;

Fig. 23 is a sectional detail taken on the line 23—23 of Fig. 22;

Fig. 24 is a lower end view of the stapling device shown in Figs. 22 and 23;

Fig. 25 is a view similar to that of Fig. 23 showing a staple after being forced through the backing member and ready to be clinched;

Fig. 26 is a perspective view of the staple advancing tongue;

Fig. 27 is a perspective view of the two stapling jaws between which the tongue of Fig. 26 reciprocates in advancing the staple to stapling position;

Fig. 28 is a vertical sectional detail taken at right angles to the showing of Fig. 22 with the staple forming parts in elevated position prior to the formation of the staple;

Figs. 29 and 30 are sectional details taken on the lines 29—29 and 30—30 of Fig. 28;

Fig. 31 is an enlarged sectional detail of the feeding means for the stapling wire as seen at the left of Fig. 18 and taken from the line 31—31 of Fig. 32;

Fig. 32 is a plan view of the device shown in Fig. 31;

Fig. 33 is a perspective view of a feeding roller for the stapling wire;

Fig. 34 is an elevational detail taken on the line 34—34 of Fig. 31;

Fig. 35 is a similar view showing the parts in a different state of operation;

Fig. 36 is a cross section taken on the line 36—36 of Fig. 35.

The machine comprises, as particularly shown in Figs. 1 and 2, the following main units: a set A of star wheels which perform the primary feeding and crimping or offsetting operation, a set B of star wheels which also perform a feeding operation and a secondary crimping or offsetting operation, a truing and aligning device C, stapling mechanism D, means E for advancing the strip after stapling, means F for coating the strip with an adhesive liquid, means G for applying a pulverulent material to the back of the strip, and means H for applying a granular or fibrous bonding material to the face of the strip.

The operative mechanism of the machine (see Fig. 5) is carried upon a frame work having side rails 1 supported in any suitable manner. The main drive shaft 2 journalled at intervals as required, is carried below the side rails 1 and is adapted to be driven through the medium of a prime mover 3 by a belt driven pulley 4 keyed on a shaft 5 having a gear 6 meshing with a gear 7 fast on said shaft 2, these being housed as indicated at 8 and mounted on a side rail 1, as shown in Fig. 6. The main shaft 2 also is provided, as shown in Figs. 7 and 8, with an intermittent gear 10 having a short series of teeth 11 adapted to mesh intermittently with various sets of teeth on a gear 12 fast on a shaft 13, these gears being housed as indicated at 14. The intermittent gear 10 is provided with an elongated tooth or rib 15 adapted to enter transverse grooves 16 in the gear 12 between the various sets of teeth thereon for producing pauses in the operation of the shaft 13. The shaft 13 carries on the opposite end a gear 18 meshing with gear 19 for driving a shaft 20, the two shafts 13 and 20 carrying the primary set A of star-wheels which perform the initial crimping and feeding operations of the wire mesh W supplied from a roll R. The gear 18 also meshes with an idler gear 21 which in turn is in mesh with a gear 22 fast on a shaft 23 and in its turn meshing with gear 24 fast on a shaft 25, the shafts 23 and 25 carrying the secondary set B of star-wheels.

The set A of star wheels (see Figs. 9 and 10) comprises a series of upper and lower interfitting wheel sections respectively designated at 26 and 27, each of which sections is provided with a plurality of pyramidal projections 28 hexagonal in cross section, adapted to enter the meshes of the wire strip for the purpose of aligning the meshes and feeding the wire. The upper wheels 26 are provided with crimping projections 29 adapted to engage the strands of the wire strip and force the same into recesses 30 in the wheels 27 for the purpose of forming crimps or offsets 31 in the wire W, this operation being performed on alternate meshes as indicated at the right of Fig. 3.

The secondary set B of star-wheels (see Fig. 11) is composed of the upper and lower series of wheel sections 32 and 33 mounted respectively upon the shafts 25 and 23. As in the case of the series of sections 26 and 27 of the star wheels A each wheel section 32—33 is formed with a plurality of pyramidal projections 34 of hexagonal cross section which also serve to enter the meshes of the wire strip and align and feed the same. In this set B of star-wheels, each of the upper series is provided with a plurality of crimping projections 35 double the number of the projections 29 of the set A, certain of said projections 35 being adapted to engage the strands of wire and enter the crimps 31 formed by the projections to maintain the shape thereof, and other projections 35 being adapted to force portions of intermediate meshes into openings 36 in the series 33 of star-wheels for the formation of the crimps or offsets 31' as also indicated in Fig. 3. In this manner the longitudinally extending sides of each of the meshes, which sides in practice are composed of two wire strands twisted together, are provided with downwardly offset crimps 31 or 31' after leaving the set B of star-wheels. The star-wheels in both sets are also provided with openings 38 for receiving the pyramids 28 and 34 during rotation of said wheels. In both sets the star-wheels are necessarily staggered in order to enter the meshes of the wire. In the upper set A the projections 29 are disposed between the pyramidal members 28 while in the set B the projections 35 are disposed both between the pyramids 34 and at the sides thereof.

The crimped wire mesh thus formed is passed along the bed of the machine under a roller 39 to the aligning and truing device C the function and operation of which is best indicated in Fig. 15. This device comprises a pair of superimposed reciprocating plates 40 and 41 respectively. The upper plate 40 is carried in a vertically reciprocable carriage 42 whose lower end is provided with a bearing 43 receiving an eccentric 44 driven from a shaft 45 by means of gear 46 mounted in the housing 47 and in turn driven from gear 48 keyed on the main drive shaft 2. The lower plate 41 is reciprocated by means of a cam 50 fast on the shaft 45, which cam engages an antifriction roller 51 carried in a stem 52 adjustably secured to a web on the bottom of the plate 41 as by means of a bolt 53 and adjusting screw 54. By these means the two plates 40 and 41 are adapted to be separated for movement of the crimped wire therethrough.

The operation of feeding the wire mesh forward, which as above stated, is performed through the medium of the intermittent gear 10 on the main shaft 2, consists in advancing said wire strip two meshes at a time thus bringing two of the offsets 31 and 31' into position between the plates 40 and 41 at each operation. The plate 40 is provided with three depending webs 55 provided with notches 56 which are flared at their lower ends and contracted at their upper ends to a size approximately to fit the twisted wire crimps whereby the flared portions guide the wire into position in said upper portions and serve to align the meshes. The lower plate 41 is provided with co-operating slots 57, the upper portions of said slots 57 being shouldered at 58 sufficiently to accommodate the thickness of the twisted wire crimps 31, as best seen in Fig. 16. Thus, when the upper and lower plates 40 and 41 are moved toward each other to the position indicated in Figs. 16 and 17 the sides of the webs 55 will bend the wires over the edges of the slots 57 above the shoulders 58 and will carry them into the corners formed by said shoulders 58, the lower wire-portions then extending transversely of each slot 57 from one shoulder 58 to the other and through the contracted portions of the notches 56. This operation results in truing and squaring the offsets 31 and 31'. Since only two of the crimps are fed between the plates 40 and 41 at one movement the crimp supplied under the third web 55 as indicated at the left of Fig. 15 will already have been trued and squared and will assist materially in positioning the meshes.

The wire strip having the offsets 31 thus formed therein is advanced under a roller 39' to a stapling device D for the purpose of stapling certain of the offsets to a backing sheet of building paper or pulp board P from a roll P¹ and passed over a roller 60 into position beneath the crimped wire strip, whence both the wire strip and paper backing sheet are carried beneath the stapling mechanism D. The stapling mechanism comprises a plurality of stapling devices arranged in a staggered relation in two spaced rows transversely of the machine, each row being adapted to staple alternate offsets in a transverse row of offsets, and the two rows of stapling devices are spaced to operate upon the first and fourth rows of any four rows of offsets, two rows of offsets thus being positioned between the two rows of stapling devices at any stapling operation. Since the wire strip is fed through the machine two meshes at a time each stapler will staple alternate offsets as the wire strip moves longitudinally. Thus, referring to Figs. 3 and 19, the transverse row of staples 61 will have been placed by the staplers indicated at the right of Fig. 19 by a previous operation, the row 62 being stapled by the same staplers and the row 63 being stapled by the staplers shown at the left during the operation indicated in said Fig. 19. A row of staples will be placed in the transverse row indicated at 64 by the left row of staplers at the next succeeding operation. The result will be a staggered arrangement of staples as indicated at the left of Fig. 3.

The stapling mechanism is disclosed in Figures 18 to 30. This mechanism comprises a plurality of stapling devices 65 and 65' arranged in two rows carried respectively upon stapler racks 66 and 66' these racks being supported upon brackets 67 bolted to the two side rails 1 by means of bolts 68 which also secure guiding standards 69. Each standard 69 carries slotted yokes or plates 70 and 71 reciprocably mounted upon vertically extending laterally offset guiding tongues 69' on said standards. The yokes 70 and 71 carry and actuate the movable stapling elements. The yoke 70 is provided with laterally disposed arms 70' which carry two parallel horizontally arranged bars 72, while the yoke 71 is provided with laterally extending arms 71' which carry two parallel horizontally arranged bars 73. (See Fig. 22.) The bars 72 enter notches provided in the sides of stapling members 74 vertically reciprocable in the stapler bodies 65, each member 74 having at its lower end two spaced staple-forming jaws 74', while the horizontal bars 73 enter notches in the sides of vertically reciprocable staple-projecting plungers 75 working in the members 74 and between the jaws 74'. Each plunger 75 is provided at opposite sides with vertical guides 76 slidably received in grooves 77 on the inner sides of the forming jaws 74', said grooves 77 extending upwardly to the tops of the members 74. The lower ends of the jaws 74' are grooved transversely at 78 for the purpose of receiving staple-forming wires S during the forming operation, which wire is introduced from the side of each stapler 65 through a guiding nipple 79, as seen in Fig. 28 wherein the forming jaws 74' and the plungers 75 are shown in elevated position. The wire S is positioned and retained by means of a pair of guiding arms 80 pivoted at 81 in the lower part of the stapler body 65, the lower parts of the arms 80 being laterally offset toward each other and notched at 82 for the purpose of receiving said wire S. Disposed alongside of the arms 80 is a pair of similar arms 84 and 85 also carried upon the pivots 81 and similarly offset laterally towards each other. However, the offset portion of the arm 84 is somewhat longer than that of the other arm 85 and is notched at 86 to receive the middle portion of that part of the wire S which is to be formed into a staple and to retain the same during engagement of the ends thereof by the forming jaws 74' and prior to engagement by the plunger 75. Both sets of wire positioning jaws 80 and 84, 85 are normally urged toward engaging position by springs 87.

The yokes 70 which carry the bars 72 and actuate the members 74 and the forming jaws 74' are adapted to be reciprocated by means of cams 88 (see Fig. 18) fixed upon a shaft 89 carrying a gear 90 driven by a gear 91 housed at 92 and keyed upon the main drive shaft 2. By this means each member 74 and its forming jaws 74' are driven downwardly into engagement with the ends of arms 80, thereby separating the latter, and into engagement with the two end portions of the staple-forming section of the wire S, said section being sheared off by a small shearing plate 92 fixed on the outer side of one of the jaws 74', as shown in Fig. 27. Continuation of this movement bends said end portions of the staple downwardly into parallel position with said ends lying in the lower portions of the grooves 77 as best seen in Fig. 23. The staple projecting plunger 75 is then driven downward under influence of cams 94 (see Fig. 18) also carried on said shaft 89, which cams actuate the yokes 71. This movement causes separation of the wire holding arms 84 and 85 through engagement by the beveled end of the plunger 75, whereupon the plunger 75 engages the middle portion of the staple, the latter being received in an arcuate groove 95 in the end of said plunger 75, and the ends of the staple are forced from the grooves 77 and through the paper backing P.

The ends of the staple S are then ready to be clinched. This is accomplished by means of a pair of overlapped pawls 96 which are pivoted at 97 on the sides of a stationary bed plate 98, a bracket 99 being pivoted to carry one end of the pivot 97, and to guard and position said pawls 96. Immediately below the bed plate 98 is a sub-plate 100 having upstanding tongues 100' adapted to engage and actuate said pawls 96 whereby the outer ends of the pawls are swung about the pivot 97 and upwardly into engagement with the ends of the staples S as indicated in dotted lines in Fig. 25. This operation clinches the staples into the form shown in Fig. 4, the lower ends of the forming jaws 74' serving as backing means against which the clinching operation is performed. The movement of the sub-plate 100 is produced by means of cams 102 fixed on the shaft 89 and adapted to engage friction rollers 103 carried on the lower ends of the stems 104 mounted on a web on the underside of the plate 100 by bolts 105 and adjustably positioned by means of screws 106. In this manner the wire lath is stapled to the backing P.

The stapling wire S is supplied to the stapler 65 by the means shown at the left of Fig. 18 and disclosed in greater detail in Figs. 31 to 36. This means comprises a wire reel 110 for each stapler from which the wire is led to a guiding tube 111 which extends to the respective stapler body 55. In order that wire which has once been fed into a stapler may not be withdrawn (see Fig. 31) a leaf spring 112 is employed whose lower end is curved and projects through a slot 113 in the upper side of the tube 111 and into engagement with the wire S. This curved spring will permit feeding of the wire but will prevent its return. The wire S is fed to the guiding tube 111 by means of a feed roll 114 and a co-operating roll 115 being driven by gear 116 in mesh with gear 117 which together with the roll 114 is keyed to shaft 118. Shaft 118 is driven as shown in Fig. 5, through the medium of two sets of beveled gears 119 and 120 from the main driven shaft 2. Feed roll 114 has a nearly annular flange 121 adapted to engage the co-operating roll 115 and is also provided with a wire receiving groove 122 which is completely annular in form but is slightly smaller in diameter than the flange 121. At one point as indicated at 123 in Figs. 33 and 36, the flange 121 is cut away, the body of the roll 114 being correspondingly cut away at 124. During the greater part of rotation of the feed roll 114 the flange 121 engages roll 116 and elevates the latter sufficiently to free the wire S from feeding engagement with the rolls as indicated in Fig. 34. But, when the flattened portions 123 and 124 are brought into position opposite the roll 115, said roll 115 is relieved from the flange 121 and drops upon wire S in the feeding groove 122 thereby producing frictional engagement sufficient to cause the wire S to be fed forward through the respective stapler 65 indicated in Fig. 24. When the required amount of wire has been so fed the flange 121 again engages the roll 115 and lifts the latter from contact with the wire, whereupon feeding stops and the wire slides in the groove 122. Each roller 115 and its gear 116 is journalled between two arms 125 of a bracket which is pivoted on a shaft 126. The free ends of the bracket arms 125 are engaged by a washer 127 under the influence of a spring 128 tensioned by means of a nut 129 threaded on a swinging bolt 130 pivoted at 131 below said free ends of said arms 125. Thus the tension required to cause the roll 115 to drive a wire S when in engagement therewith, is obtained by the spring 128, said spring being adapted to yield under the lifting influence of the flange 121 to free said wire S from feeding engagement. The ends of the arms 125 are rounded as shown at 132 to permit the bolt 130 to be swung to the left in Fig. 31 to entirely free said arms 125 in order that the latter may be elevated from operative position by swinging about the pivot 126. It will be noted that the amount of movement required by the roll 115 to move the same to and from driving engagement with the wire S will be very slight and that the gear teeth 116 and 117 will readily absorb such movement without disengagement.

After the crimped wire mesh has been stapled to the paper backing P by the means above described the same is moved forward under influence of the star-wheel sets A and B assisted by advancing means shown at E in Figs. 1 and 5, this means comprising a plurality of wheels 135 provided with projections 136 adapted to enter the meshes of the wire. The wheels 135 are driven by means of a chain 137 passing over sprockets 138 and 139 mounted respectively on the shaft 25 of the star-wheel set B and on the shaft 140 carrying the feed wheels 135.

As shown in Fig. 2 the lath structure is then fed into a vessel 145 containing waterproofing and adhesive material, the lath being submerged under the influence of a roller 146, whence the structure passes over a hopper 147 for applying dry comminuted fire proofing material to the underside thereof and under a hopper 148 which scatters granular absorptive and fire proofing material on the top thereof. The structure is thus completed for the market. The water proofing material acts also as a cement which binds the offsets 31 to the backing and insures a perfect union in conjunction with the staples. The fire proofing material may also be highly absorptive of moisture, such as kieselguhr, which will insure a better bond when plaster or the like is applied.

Summarizing, it will be clear from the foregoing that ordinary poultry wire, which may be purchased upon the market, is fed to the primary set A of star-wheels which form offsets 31 in the twisted portions of alternate meshes of the wire and feed the same to the secondary set B of star-wheels which in turn form offsets 31' in the intermediate meshes and in conjunction with the influence of the advancing device E at the opposite end of the machine, serve to feed the material to the aligning and truing device C which completes the formation of the crimped offsets 31 and 31'. Thence the wire mesh W is passed to the stapling mechanism at D where wire S, which is fed by the means shown in Figs. 31 to 36 inclusive, is formed into staples by the forming jaws 74' reciprocating in each of the stapler bodies 65, the staples then being forced through the paper backing sheet P by the staple-projecting plunger 75, and the ends of the staples being clinched by the pawls 96 as indicated in Fig. 28. Thence, the assembled structure is passed to the water proofing and fire proofing devices as shown in Figure 2 from which it emerges in sheet form ready to be cut into lengths for the market.

I claim:—

1. In a machine of the character disclosed, means to supply wire mesh and a backing sheet thereagainst, and means to staple the mesh to the sheet comprising staplers arranged in two sets to staple alternate meshes.

2. In a machine of the character disclosed, means to supply wire mesh and a backing sheet thereagainst, and means to staple the mesh to the sheet comprising staplers arranged in two sets to staple alternate meshes, the two sets being arranged in spaced rows.

3. In a machine of the character disclosed, means to supply wire mesh and a backing sheet thereagainst, and means to staple the mesh to the sheet comprising staplers arranged in two sets to staple alternate meshes, the two sets being arranged in spaced rows with the staplers in one row staggered with relation to those in the other row.

4. In a machine of the character disclosed, means to supply wire mesh and a backing sheet thereagainst, means to staple the mesh to the sheet comprising staplers arranged in two sets to staple alternate meshes, the two sets being arranged in spaced rows, and means to operate each set of staplers as a unit.

5. In a machine of the character disclosed, means to supply wire mesh and a backing sheet thereagainst, means to staple the mesh to the sheet comprising staplers arranged in two sets to staple alternate meshes, and means beneath each stapler to clinch the staples.

6. In a machine of the character disclosed, means to supply wire mesh and a backing sheet, means to staple the mesh to the sheet comprising a plurality of staplers each of which comprises a pair of forming jaws and a staple-projecting plunger, the forming jaws being movable into position against the sheet for projection of the staple, and means opposite the forming jaws to clinch the staples against the ends of said jaws.

7. In a machine of the character disclosed, a stapler comprising a pair of reciprocable forming jaws, a staple-projecting plunger, means to supply wire mesh and a backing sheet thereagainst to said stapler, and means opposite the ends of said jaws at the limit of their reciprocation for clinching staples against the backing sheet.

8. In a machine of the character disclosed, a stapler comprising a pair of reciprocable forming jaws, a staple-projecting plunger, means to supply wire mesh and a backing sheet thereagainst to said stapler, means opposite the ends of said jaws at the limit of their reciprocation for clinching staples against the backing sheet, said means comprising a pair of pivoted pawls and means for swinging said pawls against the staple ends.

9. In a machine of the character disclosed, means for feeding a strip of wire mesh and a backing sheet thereagainst; and means to staple the strip of wire mesh to the backing sheet comprising a plurality of staplers operable to staple the meshes of the strip to the backing sheet.

10. In a machine of the character disclosed, a plurality of staplers arranged in a row, and means for delivering a strip of wire mesh and a backing sheet thereagainst to the staplers; said staplers being operable to staple the mesh to the backing sheet in rows extending transversely and longitudinally thereof.

11. In a machine of the character disclosed, a plurality of staplers, and means for intermittently feeding a strip of wire mesh and a backing sheet thereagainst to said staplers.

12. In a machine of the character disclosed, means for feeding a strip of wire mesh and a backing sheet thereagainst; and means for stapling the wire mesh to the backing sheet comprising a plurality of staplers, means for feeding wire to said staplers and means operable to form the wire into staples; said staplers being operable to place the staples so as to fasten the mesh to the backing sheet.

13. In a machine of the character disclosed, means for feeding a strip of wire mesh and a backing sheet thereagainst; and means for forming and driving staples to connect the mesh to the sheet operable to position the staples astride wires of the mesh with the ends of the staples penetrating the backing sheet and bent in opposite directions against the under sides of the backing sheet.

WILLIAM D. HICKS.